(No Model.)

W. A. SCHLEICHER.
WHIFFLETREE COUPLING.

No. 536,046. Patented Mar. 19, 1895.

WITNESSES

INVENTOR
William A. Schleicher
by his Attorneys
W. Bancroft & Co.

UNITED STATES PATENT OFFICE.

WILLIAM A. SCHLEICHER, OF CLEVELAND, OHIO.

WHIFFLETREE-COUPLING.

SPECIFICATION forming part of Letters Patent No. 536,046, dated March 19, 1895.

Application filed October 6, 1894. Serial No. 525,081. (No model.)

*To all whom it may concern:*

Be it known that I, WILLIAM A. SCHLEICHER, of Cleveland, in the county of Cuyahoga and State of Ohio, have invented a new and useful Improvement in Whiffletree-Couplings, of which the following is a full, clear, and exact description, reference being had to the accompanying drawings, forming part of this specification, in which—

Figure 1:
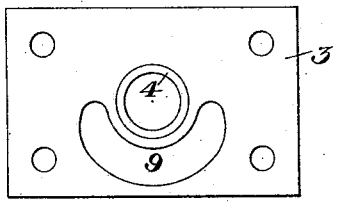
Figure 2:
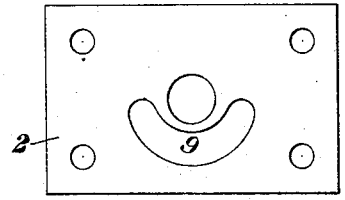
Figure 5:
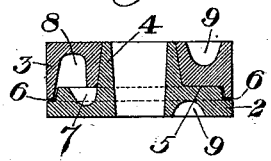
Figure 3:
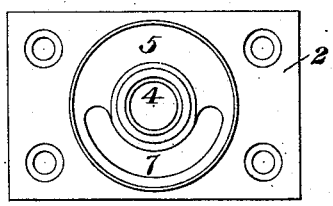
Figure 4:
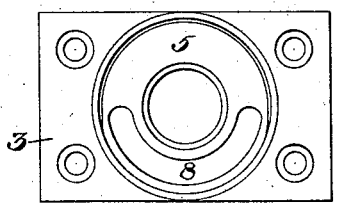

Figures 1 and 2 are plan views of the outer sides of the top and bottom plates respectively of the whiffletree-coupling. Figs. 3 and 4 are similar views of the inner sides thereof; and Fig. 5 is a central section of the two plates when conjoined.

Like symbols of reference indicate like parts in each figure.

In the drawings, 2 and 3 are the plates of the whiffletree-coupling. The plate 2 has a central hub 4 around which fits the eye of the other plate 3, and the plates have annular bearing surfaces 5 5, and 6 6, which are respectively in contact with each other. Each of the bearing surfaces 5, 5, is plain throughout one half of its circumference, and the other half is grooved, as at 7, 8, and when the plates are fitted together the plain ungrooved portion of each is set in contact with the plain ungrooved portion of the other, said plain ungrooved portions being at the front segment of the coupling, *i. e.*, the segment next to the horses. As the wear is on that segment of the coupling, the broad bearing surfaces there provided render the coupling very durable and efficient, while the grooving of the surfaces at the other side does not detract from its usefulness, and lessens the weight of metal in the parts. For a similar purpose I prefer to groove the outer sides of the coupling plates as at 9. Furthermore, as the wear in whiffletree couplings is mainly on the semi-circular segment next to the horses, in couplings as heretofore constructed this unevenness in wear is apt to render the bearing faces untrue, and to impair the usefulness of the device. In my coupling, however, as the rear segment is grooved, this cannot occur, and the faces wear away evenly and, when loose, can readily be brought into contact by tightening the usual connecting bolt.

The advantages of my invention will be appreciated by those skilled in the art.

Within the scope of my invention as defined in the claims, modifications in the construction of the parts of the device may be made by the skilled mechanic, since

What I claim as new is—

1. A whiffletree coupling having upper and lower plates whose bearing surfaces are in contact substantially throughout their width at the front of the axis of the plate, and are grooved at the rear of the axis; substantially as described.

2. A whiffletree coupling having upper and lower plates whose bearing surfaces are in contact substantially throughout their width at the front of the axis of the plate and are out of contact for a portion only of their surfaces at the rear of the axis; substantially as described.

In testimony whereof I have hereunto set my hand.

WILLIAM A. SCHLEICHER.

Witnesses:
EMIL W. JAITE,
MARTIN O. SENSENY.